US009109476B2

(12) United States Patent
Tsunashima et al.

(10) Patent No.: US 9,109,476 B2
(45) Date of Patent: Aug. 18, 2015

(54) LUBRICATING DEVICE FOR POWER UNIT

(71) Applicant: HONDA MOTOR CO., LTD, Tokyo (JP)

(72) Inventors: Kousuke Tsunashima, Wako (JP); Masafumi Taki, Wako (JP); Seiji Hamaoka, Wako (JP); Taku Hirayama, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 316 days.

(21) Appl. No.: 13/902,491

(22) Filed: May 24, 2013

(65) Prior Publication Data
US 2013/0333980 A1 Dec. 19, 2013

(30) Foreign Application Priority Data

Jun. 14, 2012 (JP) .................................. 2012-134494

(51) Int. Cl.
*F01M 1/02* (2006.01)
*F16H 57/04* (2010.01)
*F01M 11/00* (2006.01)
*F01M 1/12* (2006.01)

(52) U.S. Cl.
CPC .............. *F01M 1/02* (2013.01); *F16H 57/045* (2013.01); *F16H 57/0447* (2013.01); *F16H 57/0473* (2013.01); *F16H 57/0475* (2013.01); *F01M 11/0004* (2013.01); *F01M 2001/123* (2013.01); *F01M 2011/0095* (2013.01)

(58) Field of Classification Search
CPC .............. F16H 57/0447; F16H 57/045; F16H 57/0473; F16H 57/0475; F01M 11/02; F01M 11/03; F01M 11/0004; F01M 2001/123; F01M 2011/0095
USPC ................................ 184/6.5, 6.12; 123/196 R
See application file for complete search history.

(56) References Cited

U.S. PATENT DOCUMENTS

| 8,267,052 B2 * | 9/2012 | Takano ...................... 123/41.33 |
| 8,904,989 B2 * | 12/2014 | Matsuo et al. ............. 123/196 R |
| 2002/0003064 A1 * | 1/2002 | Ito et al. ...................... 184/6.5 |
| 2004/0040531 A1 * | 3/2004 | Yamamoto ................ 123/196 R |
| 2007/0266986 A1 * | 11/2007 | Hoi ............................ 123/196 R |

FOREIGN PATENT DOCUMENTS

| JP | 2006-105132 A | 4/2006 |
| JP | 2010-208602 A | 9/2010 |

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

A lubricating device for a power unit includes an oil pan, an oil tank being separated from the oil pan, a scavenging pump for circulating the received oil of the oil pan to the oil tank, and a feed pump to feeding oil stored in the oil tank to the engine and the transmission, wherein an oil reservoir for storing a certain amount of oil to immerse a lower part of a clutch that connects and disconnects a transmission route between the engine and the transmission is provided in a power unit case, and a first overflow passage is provided in the oil tank such that when the stored oil in the oil tank is increased beyond a first level, the first overflow passage allows the increased oil to overflow into the oil reservoir side.

9 Claims, 7 Drawing Sheets

LUBRICATING DEVICE FOR POWER UNIT

CROSS-REFERENCE TO RELATED APPLICATIONS

The present application claims priority under 35 U.S.C. §119 to Japanese Patent Application No. 2012-134494, filed Jun. 14, 2012, the contents of which is incorporated herein, by reference, in its entirety.

TECHNICAL FIELD

The present invention relates to a lubricating device for a power unit, which comprises an oil pan for receiving oil that has lubricated an engine and a transmission, an oil tank separated from the oil pan, a scavenging pump for circulating or returning the received oil of the oil pan to the oil tank, and a feed pump for feeding the stored oil in the oil tank to the engine and the transmission, and more particularly, to the lubricating device configured to use the lubricating oil of the power unit to perform the cooling of a clutch that connects and disconnects the transmission route between the engine and the transmission.

BACKGROUND OF THE INVENTION

A lubricating device for a power unit has already been known as disclosed in Japanese patent laid-open publication No. 2010-208602, and there is also known a lubricating device configured to use the lubricating oil of the power unit to perform the cooling of the clutch, as disclosed in Japanese patent laid open publication No 2006-105132.

SUMMARY OF THE INVENTION

Hitherto, in the lubricating device which cools the clutch by using the lubricating oil of the power unit, the lubricating oil splashed up by a crank weight of the engine is stored in an oil reservoir which accommodates a lower part of the clutch, and the lower part of the clutch is immersed in the stored oil, as disclosed in Japanese patent laid open publication No. 2006-105132.

In the lubricating device of this type, variations exist in the amount of oil splashed up by the crank weight, depending upon operating conditions of the engine, so that there may be cases where the stable oil feeding to the oil reservoir becomes difficult.

A lubricating device for a power unit is provided that allows a clutch to be always cooled during operation of an engine by using a surplus part of discharge oil of a scavenging pump thereby to increase the durability thereof. In the lubricating device for the power unit having the scavenging pump and a feed pump, a pump capacity of the scavenging pump is set greater than that of the feed pump so as to securely perform the oil circulation from an oil pan to an oil tank.

According to a first feature, there is provided a lubricating device for a power unit, comprising an oil pan for receiving oil that has lubricated an engine and a transmission, an oil tank being separated from the oil pan, a scavenging pump for circulating or returning the received oil of the oil pan to the oil tank, and a feed pump for feeding stored oil in the oil tank to the engine and the transmission, wherein an oil reservoir for storing a certain amount of oil to immerse a lower part of a clutch that connects and disconnects a transmission route between the engine and the transmission is provided in a power unit case, and a first overflow passage is provided in the oil tank such that when the stored oil in the oil tank is increased beyond a first level, the first overflow passage allows the increased oil to overflow into the oil reservoir side.

According to a second feature in addition to the first feature, an outlet passage is provided in a bottom portion of the oil reservoir for allowing the oil to flow from the oil reservoir to the oil pan, wherein an outflow amount of the oil passing the outlet passage is less than an outflow amount of the oil flowing from the oil tank to the oil reservoir side.

According to a third feature in addition to the first or second feature, a second overflow passage is provided in the oil tank such that when the stored oil in the oil tank is increased beyond a second level which is higher than the first level, the second overflow passage allows the increased oil to overflow into the oil pan side, wherein flow passage resistance of the second overflow passage is set smaller than that of the first overflow passage.

According to a fourth feature in addition to the first feature, the power unit case is divided into a case cover for covering the clutch and a case block adjacent to the case cover, wherein the oil tank and the oil reservoir are formed between joining faces of the case cover and the case block. By the way, the case cover and the case block each correspond to a front case cover 10*f* and an intermediate case 10*m* in an embodiment of the present invention as described later.

Further, according to a fifth feature in addition to the third feature, an oil filler hole which is open to the oil tank above a lower edge of the second overflow passage and is normally closed by a filler cap is provided on an upper part of the oil tank.

Furthermore, according to a sixth feature in addition to the fifth feature, an oil strainer which partitions an internal part of the oil tank into an upper chamber and a lower chamber is arranged within the oil tank, wherein the oil filler hole, the first overflow passage and the second overflow passage are opened into the upper chamber, and wherein the first overflow passage and the second overflow passage are offset with respect to the oil filler hole, in a plan view from above.

According to the first feature, the oil reservoir for storing a certain amount of oil to immerse the lower part of the clutch is provided in the power unit case, and the first overflow passage is provided in the oil tank such that when the stored oil in the oil tank is increased beyond the first level, the first overflow passage allows the increased oil to overflow into the oil reservoir side. Therefore, during the operation of the engine, the surplus oil which overflows from the oil tank is stored a certain amount in the oil reservoir, and the lower part of the clutch can be immersed in the stored oil of the oil reservoir, so that, during the operation of the engine the cooling and lubrication of the clutch can be always ensured, and a power loss due to the oil stirring by a starting clutch can be controlled to the most possible extent.

According to the second feature, the outlet passage is provided in the bottom portion of the oil reservoir for allowing the oil to flow from the oil reservoir to the oil pan side such that an outflow amount of the oil passing the outlet passage is less than an outflow amount of the oil flowing from the oil tank to the oil reservoir side. Therefore, at the time of the operation of the engine, when the operation of the scavenging pump and the feed pump stops, the overflow of the oil from the oil tank to the oil reservoir side stops. On the other hand, the stored oil in the oil reservoir flows out through the outlet passage to the oil pan, whereby it is possible to empty the oil reservoir after a lapse of a predetermined time. Accordingly, when starting the engine again, since the oil reservoir is in an empty condition, the oil stirring due to the rotation of the clutch does not occur, thereby reducing the starting load, so that the engine starting can be smoothly performed.

According to the third feature, the second overflow passage is provided in the oil tank such that when the stored oil in the oil tank is increased beyond the second level which is higher than the first level, the second overflow passage allows the increased oil to overflow into the oil pan, and the flow passage resistance of the second overflow passage is set smaller than that of the first overflow passage. Therefore, after the oil tank is filled with the oil discharged from the scavenging pump, the surplus oil is allowed to overflow from the second overflow passage to the oil pan, whereby the increase in load of the scavenging pump can be restrained.

According to the fourth feature, the power unit case is divided into the case cover for covering the clutch and the case block adjacent to the case cover, wherein the oil tank and the oil reservoir are formed between the joining faces of the case cover and the case block. Therefore, there is no need for provision of a special oil tank and a special oil reservoir separate from the power unit case, whereby the power unit can be simplified in construction and lightened in weight.

According to the fifth feature, the oil filler hole which is open to the oil tank above the lower edge of the second overflow passage and is normally closed by the filler cap is provided on the upper part of the oil tank. Therefore, when the oil has been poured from the oil filler hole of the oil tank, firstly the oil fills the oil tank. Thereafter, when the oil within the oil tank is increased beyond the first and the second levels, the increased oil overflows through the first and second overflow passages so as to be stored finally in the oil pan. Accordingly, the oil feed of a predetermined amount to the oil tank and the oil pan can be preformed rapidly by the oil feeding from the single oil filler hole, and the oil feeding operation can be facilitated.

According to the sixth feature, the oil strainer having an internal part of the oil tank partitioned into the upper chamber and the lower chamber is arranged within the oil tank, wherein the oil filler hole, the first overflow passage and the second overflow passage are opened into the upper chamber, and wherein the first overflow passage and the second overflow passage are offset with respect to the oil filler hole in a plan view from above. Therefore, at the time of the oil feeding through the oil filler hole, the oil fills the oil tank firstly and, thereafter, overflows through the first and second overflow passages so as to be stored in the oil pan. Accordingly, when monitoring an oil level of the oil within the oil pan with an oil gauge, excessive feed to the oil pan can be prevented. Moreover, the oil filling the oil tank can be filtrated by the oil strainer.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, the embodiment applying the present invention to a straddle type four-wheeled all-terrain vehicle will be described with reference to accompanying drawings. In the description hereunder, "front", "rear", "left" and "right" are referred to in accordance with the orientation of the straddle type four-wheeled all-terrain vehicle.

Figure 1:
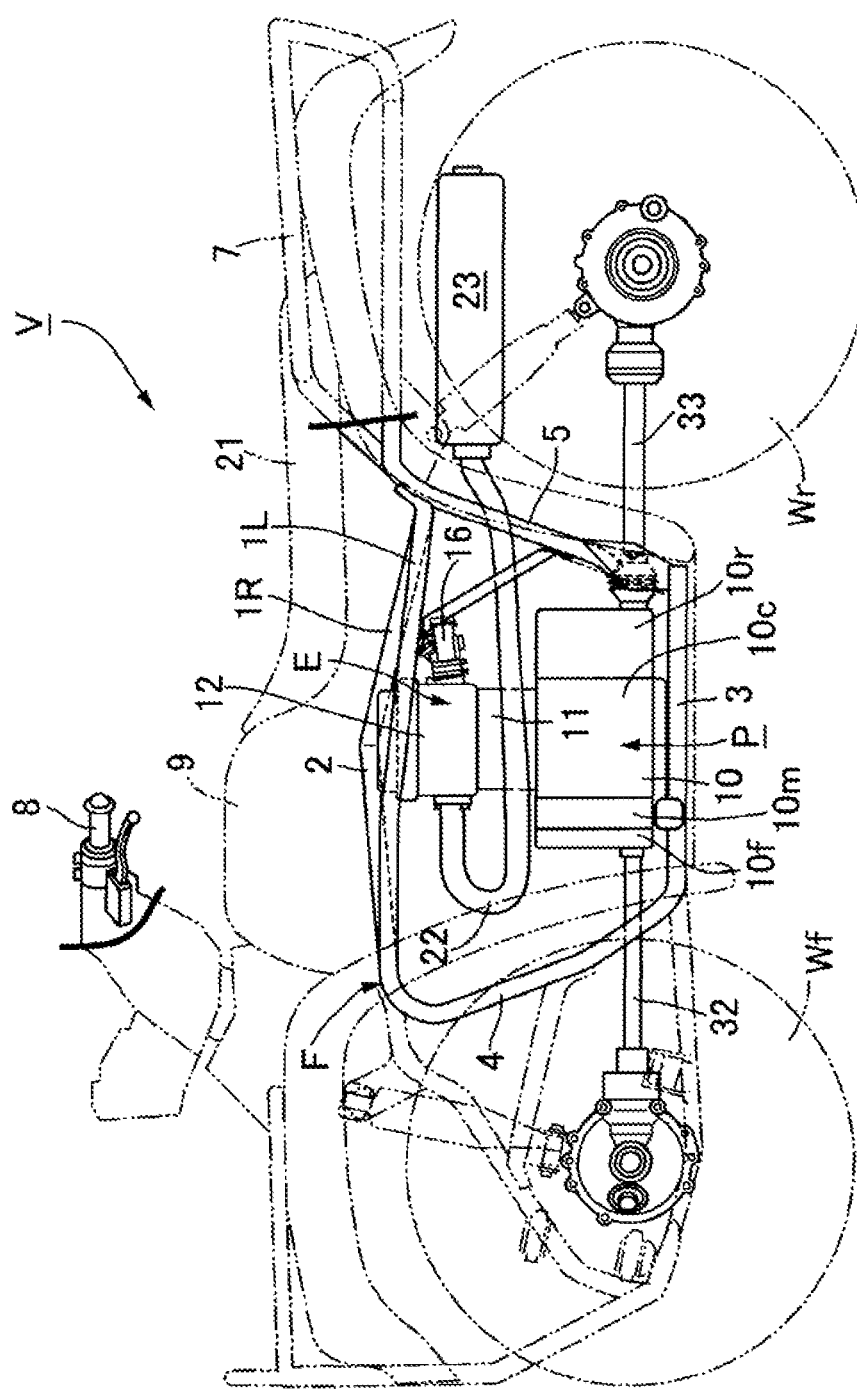
FIG. 1 is a left side view of a straddle type four-wheeled all-terrain vehicle.

First in FIG. 1, a vehicle body frame F of the straddle type four-wheeled all-terrain vehicle B comprises a pair of left and right main frames 1L, 1R having an upper side frame 2, a lower side frame 3, a front side frame 4 and a rear side frame 5 combined into a quadrilateral shape, a plurality of cross members (not shown) establishing an integral connection between the left and right main frames 1L, 1R, and a seat rail 7 connected to rear portions of the upper side frames 2 of each of the main frames 1L, 1R. From front and rear portions of the left and right main frames 1L, 1R there are suspended a pair of left and right front wheels Wf and a pair of left and right rear wheels Wr respectively. A power unit P for driving the front wheels Wf and the rear wheels Wr is mounted on the main frames 1L, 1R in such a manner as to be surrounded with the main frames 1L, 1R. Further, on upper parts of the main frames 1L, 1R a steering handle 8 and a fuel tank 9 are arranged in order from the front. A straddle type seat 21 extends from the main frames 1L, 1R to the seat rail 7 to be arranged on the upper sides of them. To an output shaft 43 (which will be described later) of the power unit P there are connected to front propeller shaft 32 for driving the front wheels Wf and a rear propeller shaft 33 for driving the rear wheels Wr.

Figure 2:
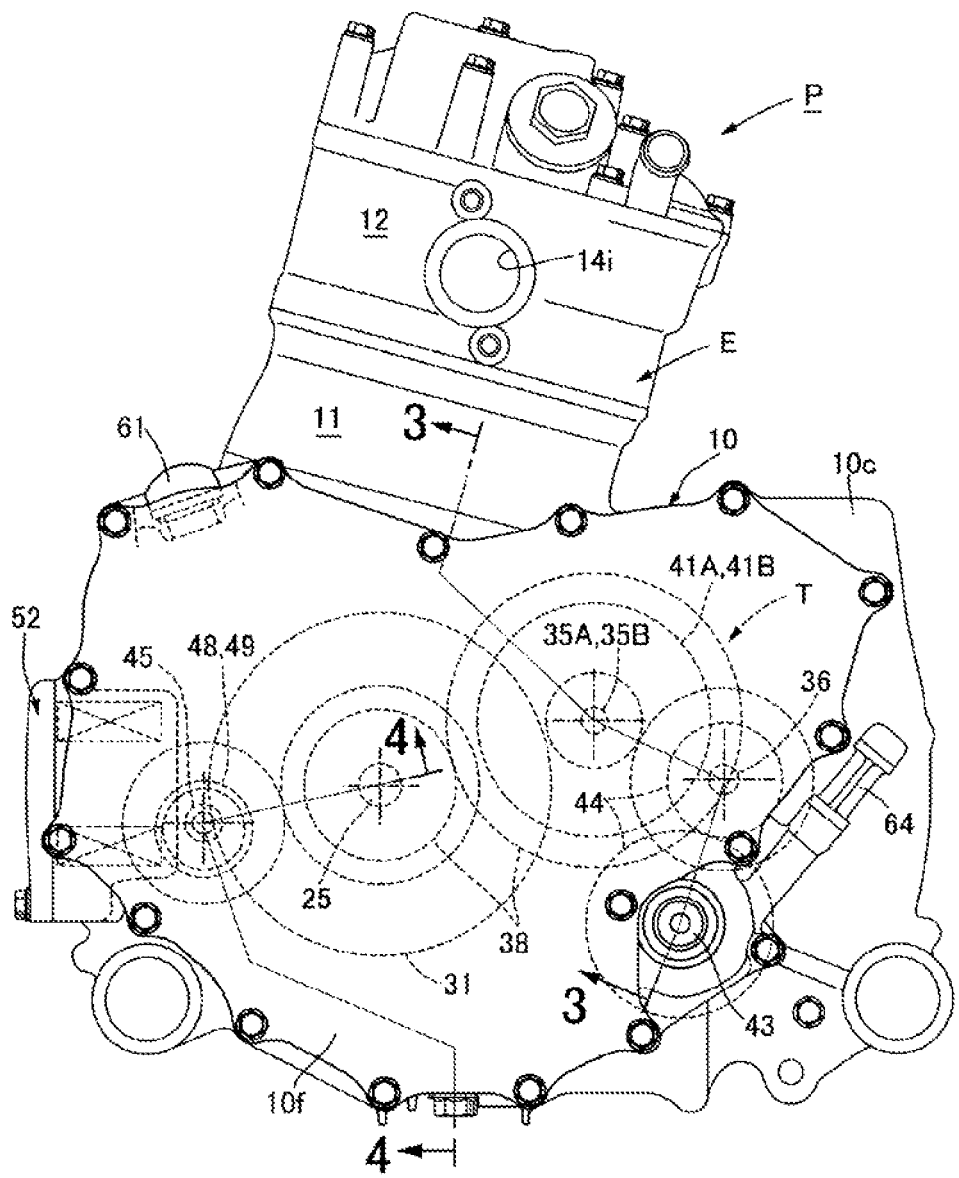
FIG. 2 is a front view of a power unit shown in FIG. 1.
Figure 3:
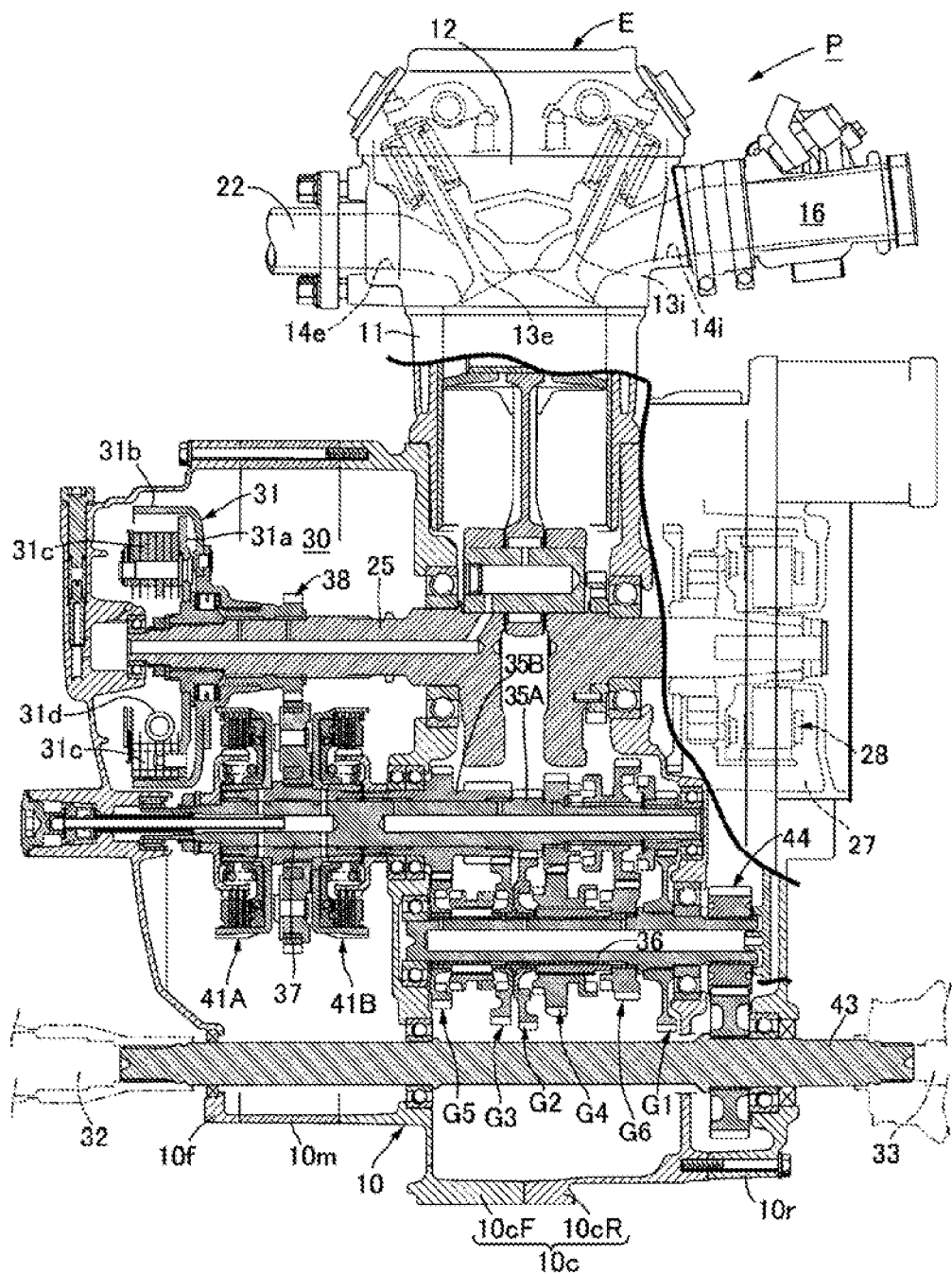
FIG. 3 is a cross sectional view taken along line 3-3 of FIG. 2.

Referring to FIGS. 2 and 3, the power unit P is formed of a water-cooled single-cylinder engine E and a transmission T which is arranged within a crankcase 10c of the engine E. A cylinder block 11 connected to and extending upward from an upper surface of the crankcase 10c is arranged in such a condition as to be tilted a little to one side in a left and right direction. A cylinder head 12 connected to an upper end surface of the cylinder block 11 is provided with an intake port 14i and an exhaust port 14e each of which is opened and closed by an intake valve 13i and an exhaust valve 13e. A throttle body 16 is connected to the intake port 14i. To the exhaust port 14e there is connected an exhaust pipe 22 a downstream end of which is connected to a silencer 2 (see FIG. 1).

As shown in FIG. 3, in the power unit P, a crankshaft 25 supported by the crankcase 10c is arranged so as to extend substantially horizontally in the forward and rearward direction. To a front end surface of the crankcase 10c there are connected an annular intermediate case 10m and a front case cover 10f in turn. A primary transmission chamber 30 is defined between the front case cover 10f and the crankcase 10c. In the primary transmission chamber 30 there is accommodated a centrifugal starting clutch 31. This starting clutch 31 comprises a driving plate 31a fixedly secured to the crankshaft 25 in splined engagement, a clutch drum 31b surrounding the driving plate 31a and supported on the crankshaft 25 in a relatively rotatable manner, a plurality of centrifugal shoes 31c pivotally supported on the driving plate 31a and swingable between a clutch-on position where they come in pressure contact with an inner circumferential surface of the clutch drum 31b and a clutch-off position where they move away from the inner circumferential surface of the clutch drum 31b, and a return spring 31d for spring-biasing the centrifugal shoes 31c to the clutch-off position side. The centrifugal shoes 31c swing to the clutch-on position in opposition to the set load of the return spring 31d when the rotational frequency of the crankshaft 25 becomes more than the predetermined rotational frequency.

Further, to a rear end surface of the crankcase 10c there is connected a rear case cover 10r in such a manner as to form an electric generating chamber 27 together with the crankcase 10c, and an electric power generator 28 is arranged in the power generating chamber 27.

As described above, the power unit case 10 is formed by the crankcase 10c, the front case cover 10f, the intermediate case 10m and the rear case cover 10r. In addition, the crankcase 10c is formed by a front case half body 10cF and ear case half body 10cR. Namely, the power unit case 10 is divided into a plurality of blocks along planes orthogonal to an axis of the crankshaft 25 and formed by joining these blocks together.

In FIGS. 2 and 3, the transmission T accommodated in the crankcase 10r has a first and second main shafts 35A, 35B and a counter shaft 36 each of which has an axis parallel to the crank shaft 25 and is rotatably supported on the crankcase 10c so as to be rotated relative to each other, and gear trains of a plurality of speed stages, for example, gear trains G1 through G6 of from first speed stage to sixth speed stage, provided in a selectively establishable manner between the first and second main shafts 35A, 35B and the counter shaft 36.

In detail, odd-numbered gear trains such as the first speed stage gear train G1, a third speed stage gear train G3 and a fifth speed stage gear train G5 are provided between the first main shaft 35A and the counter shaft 36, while even-numbered gear trains such as a second speed stage gear train G2, a fourth speed stage gear train G4 and the sixth speed stage gear train G6 are provided between the second main shaft 35B and the counter shaft 36.

In the primary transmission chamber 30, a cylindrical transmission shaft 37 which is axially adjacent to the second main shaft 35B is fitted on an intermediate portion of the first main shaft 35A in a relatively rotatable manner, and a hub of the clutch drum 31b of the starting clutch 31 is connected through a primary transmission gear train 38 to the cylindrical transmission shaft 37. A first speed change clutch 41A is interposed between the cylindrical transmission shaft 37 and the first main shaft 35A, and a second speed change clutch 41B is interposed between the cylindrical transmission shaft 37 and the second main shaft 35B, respectively.

The first speed change clutch 41A and the second speed change clutch 41B are formed each in a hydraulic multiple disc type. When hydraulic pressure is not applied to each of hydraulic chambers, they turn to an ON state by the force of a spring. When the hydraulic pressure is applied to each of the hydraulic chambers, they turn to an OFF state. The ON state of the first speed change clutch 41A allows the transmission between the cylindrical transmission shaft 37 and the first main shaft 35A to be established, and the ON state of the second speed change clutch 41B allows the transmission between the cylindrical transmission shaft 37 and the second main shaft 35B to be established. A clutch control valve 42 is configured to control the feeding and blocking of the hydraulic pressure to each of the hydraulic chambers of the first and second speed change clutches 41A, 41B.

Further, an output shaft 43 arranged parallel to the counter shaft 36 is pivotally supported on the crankcase 10c. This output shaft 43 has an intermediate portion thereof connected through an output gear train 44 to the counter shaft 36. Both ends of the output shaft 43 are connected to the front and rear propeller shafts 32, 33 outside the crankcase 10c.

Figure 4:
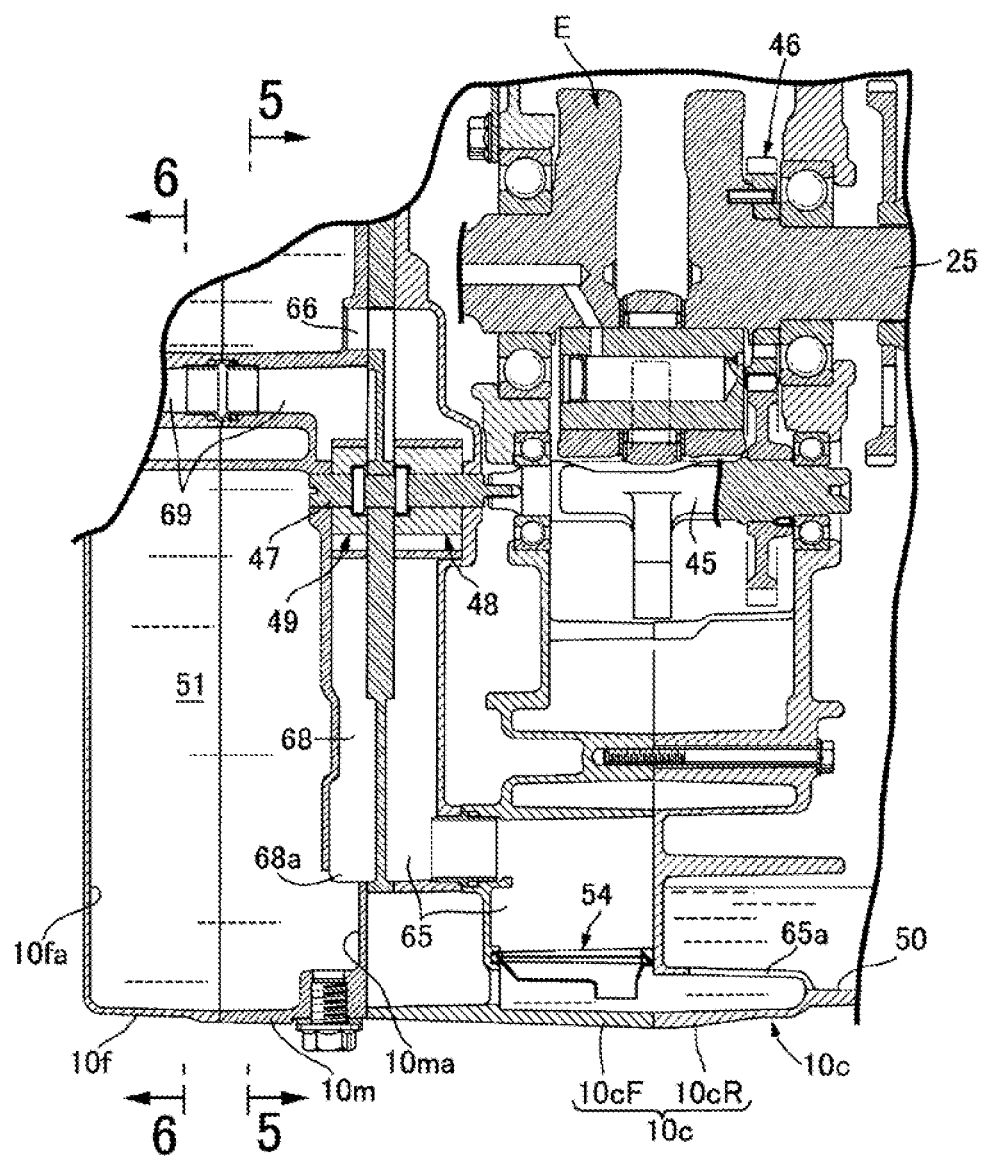
FIG. 4 is a cross sectional view taken along line 4-4 of FIG. 2.

In FIG. 4, a balancer shaft 45 which is driven in reverse through a gear train of the same diameter from the crank shaft 25 so as to reduce an engine vibration is pivotally supported on the crankcase 10c in parallel with the crankshaft 25. A scavenging pump 48 and a feed pump 49 driven by a common pump shaft 47, which is connected to a rear end portion of the balancer shaft 45, are mounted on the intermediate case 10m. Moreover, on a lateral wall of the front case cover 10f an oil filter 52 is mounted.

Figure 5:
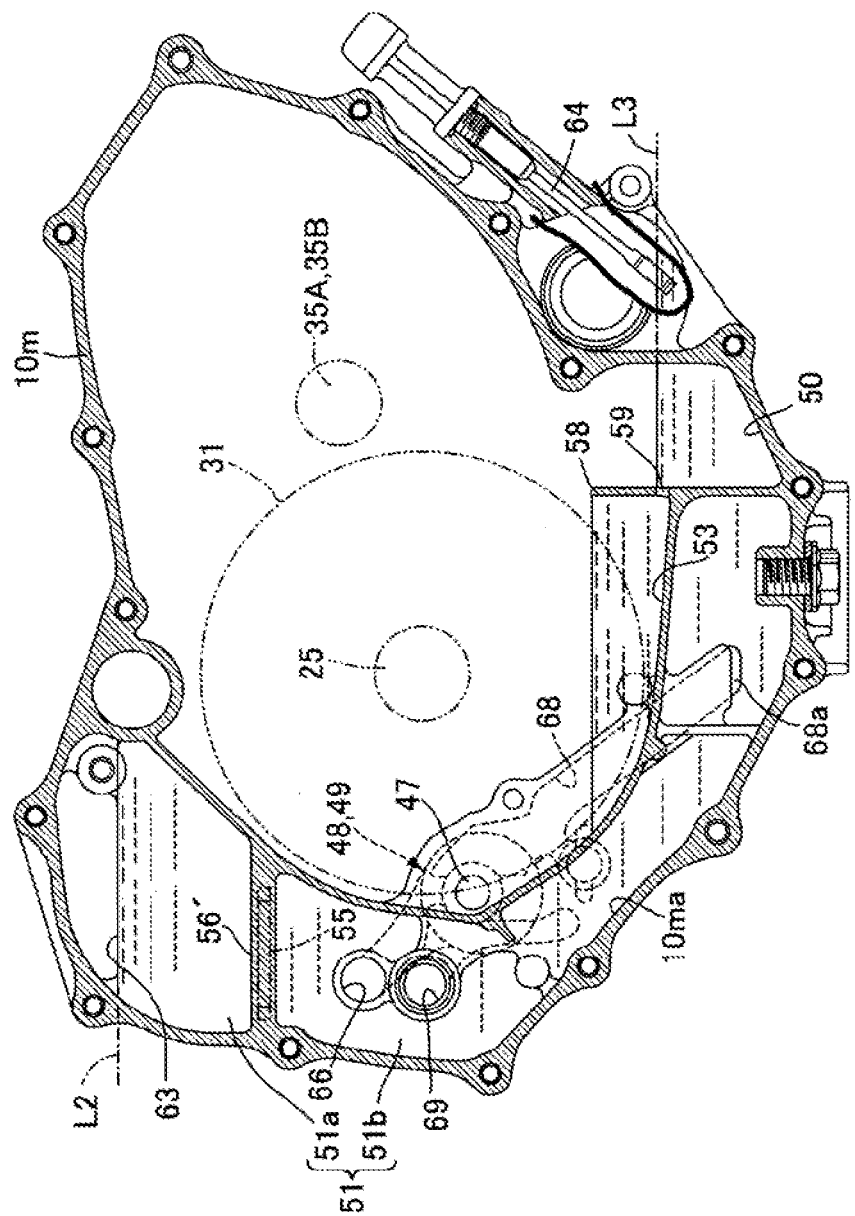
FIG. 5 is a cross sectional view taken along line 5-5 of FIG. 4.
Figure 6:
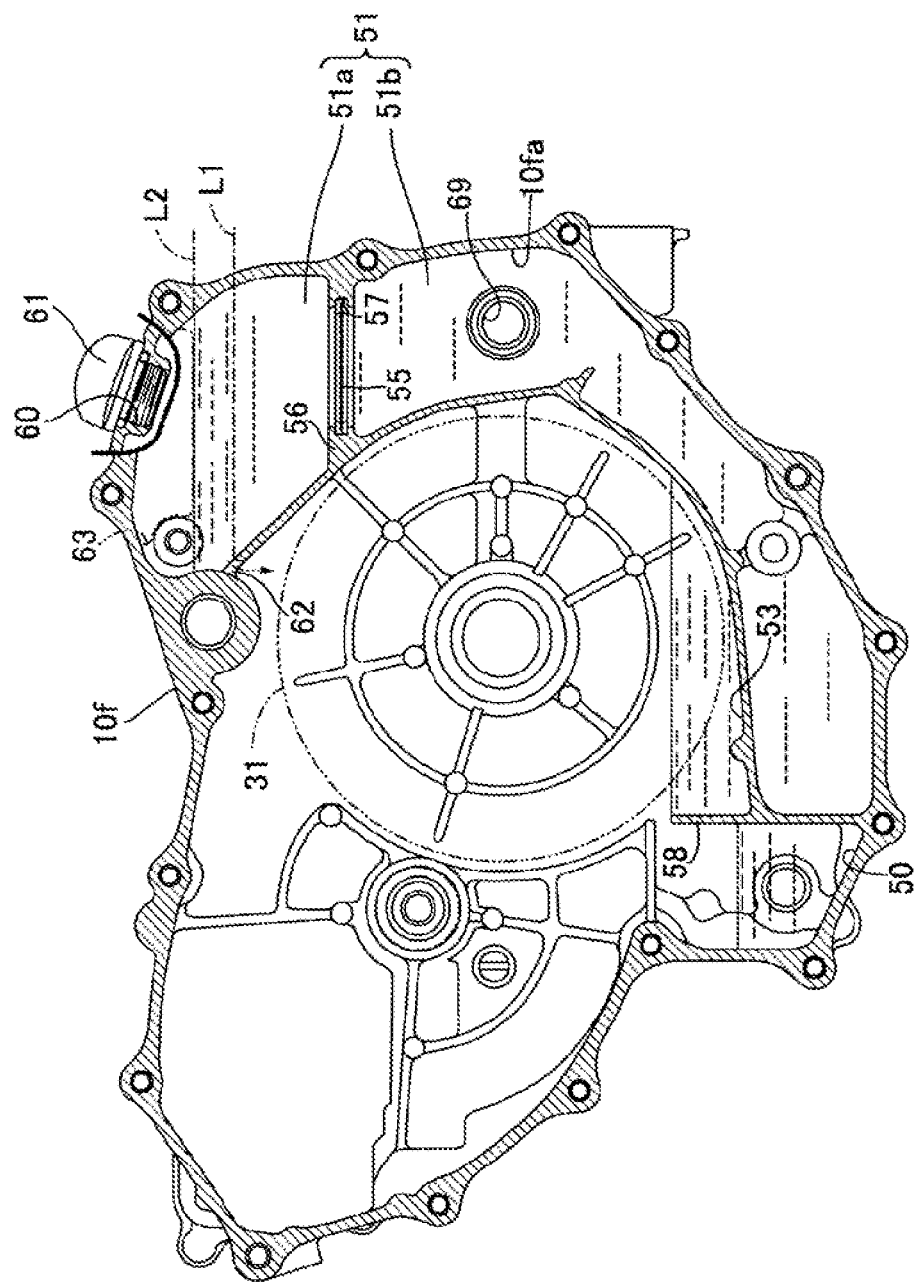
FIG. 6 is a cross sectional view taken along line 6-6 of FIGS. 4.

As shown in FIG. 4 through FIG. 6, a bottom of the crankcase 10c forms an oil pan 50 for receiving the oil that has lubricated each part of the engine and the transmission T. Further, a substantially circular arc-shaped and vertically extending oil tank 51 is formed, adjacent to an outer circumferential surface of the starting clutch 31, between joining faces of the intermediate case 10m and the front case cover 10f. In concrete terms, the oil tank 51 is formed such that substantially circular arc-shaped recesses 10a, 10ma each formed on the joining faces of the intermediate case 10m and the front case cover 10f are placed and joined in a face to face relationship. A meshed oil strainer 55 is arranged in the oil tank 51 so as to partition the same into a lower chamber 51b of a larger volume and an upper chamber 51a of small volume. The oil strainer 55 is inserted into a support groove 57 of a rib 56 projecting from the front case cover 10f to the oil tank 51 side, and is prevented from removal from the support groove 57 by a rib 56' which projects from the intermediate case 10m to the oil tank 51 side.

Moreover, between the intermediate case 10m and the front case cover 10f there is formed an oil reservoir 53 winch accommodates a lower part of the stating clutch 31, in the vicinity Of a substantially horizontal upper wall of the lower part of the oil tank 51. This oil reservoir 53 is arranged so as to occupy a position above the oil pan 50. The oil reservoir 43 is defined by a dam 58 which is formed from the intermediate case 10 to the front case cover 10f in such a manner as to extend upward from an upper wall surface of the lower part of the oil tank 51. Thus, the oil stored in the oil reservoir 53 overflows into the oil pan 50 side when the oil level goes beyond an upper end of the dam 58. On a lowermost portion of the dam 58 there is provided an outlet passage 59 to open the oil reservoir 53 to the oil pan 50 side.

Figure 7:
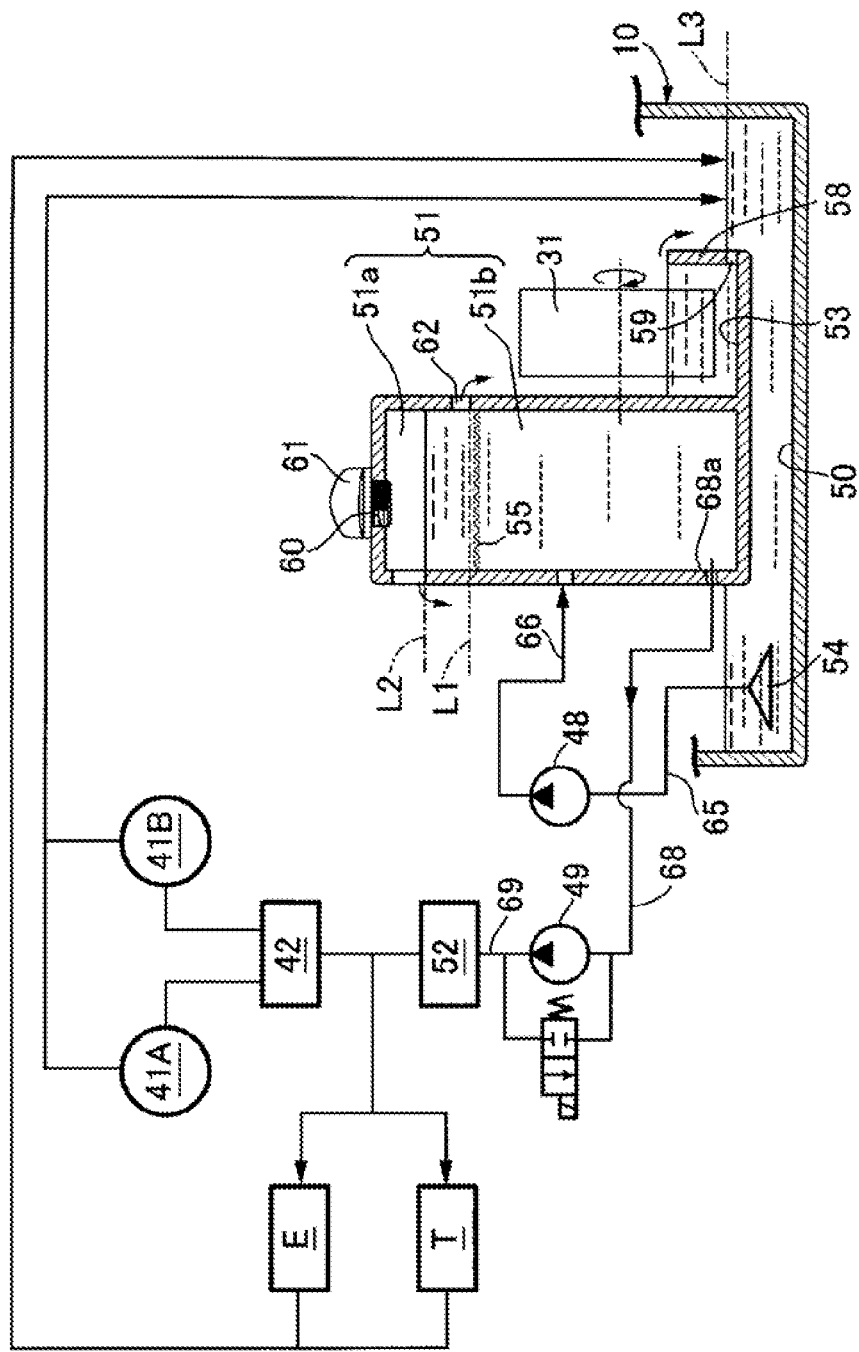
FIG. 7 is an oil route map of the above power unit.

As shown in FIGS. 5 through 7, an oil filler hole 60 opened into the upper chamber 51a of the oil tank 51 is provided on the upper end portion of the front case cover 10f. On this oil filler hole 60 a filler cap 61 for normally closing this oil filler hole 60 is screwed. On the lateral wall of the upper chamber 51 of the oil tank 51 there are provided a first overflow passage 62 and a second overflow passage 63 which is arranged in a higher position than the first overflow passage 62 and which has flow passage resistance smaller than that of the first overflow passage 62. When the stored oil in the oil tank 51 is increased beyond a predetermined first level L1, the increased oil overflows through the first overflow passage 62 into the oil reservoir 53 side. Also, when the oil level of the stored oil in the oil tank 51 is increased beyond a second level L2, which is higher than the first level L1, the increased oil overflows through the second overflow passage 63 into the oil pan 50 side.

In the above construction, the flow passage resistance of the outlet passage 59 is set greater than that of the first overflow passage 61. The oil filler hole 60 is positioned higher than the lower edge of the second overflow passage 63. Further, in a plan view from above, the first overflow passage 62 and the second overflow passage 63 are offset with respect to the oil filler hole 60. The outlet passage 59 is arranged at substantially the same level as a normal oil level L3 of the stored oil in the oil pan 50.

When feeding the power unit P with the oil the filler cap 61 is removed and a predetermined amount of oil is poured into the oil tank 51 from the oil filler hole 60. Since the oil filler hole 60 is offset from the first overflow passage 62 and the second overflow passage 63 in a plan view from above, the oil tank 51 is filled first with the poured oil. When the oil within the oil tank 51 is increased beyond the first and second levels L1, L2, the increased oil overflows through the first and second overflow passages 62, 63 and finally is stored in the oil pan 50. Accordingly, by feeding the oil from the single oil filler hole 60, the feeding of the oil of the predetermined amount can be rapidly performed, and the oil feeding operation can be simplified. In addition, an oil amount stored within the oil pan 50 can be checked with an of level gauge 64 provided on the lateral wall of the intermediate case 10m.

Referring again to FIG. 4, an upstream end 65a of a suction passage 65 communicating with a suction port of the scavenging pump 48 is opened into a bottom portion of the oil pan 51, while a downstream end 66a of a discharge passage 66 communicating with a discharge port of the scavenging pump 48 is opened into a central portion of the oil tank 51. Thus, the scavenging pump 48 is capable of sucking the oil stored in the bottom portion of the oil pan 50 and returning it into the oil tank 51.

Further, an upstream end 68a of a suction passage 68 communicating with a suction port of the feed pump 49 is opened into a bottom portion of the oil tank 51, and an oil strainer 54 is attached to the suction passage 68. A discharge passage 69 communicating with a discharge port of the feed pump 49 passes through the oil tank 51 and is connected to the oil filter 52. Thus, the feed pump 49 sucks the oil within the oil tank 51 through the oil strainer 54 and forcibly feeds it through the discharge passage 69 to the oil filter 52. A part of the oil filtrated by the oil filter 52 is selectively fed as operating oil through the clutch control valve 42 to the first and second speed change clutches 41A, 41B, while residual oil is fed as lubricating oil to each part of the engine E such as the crankshaft 25 and the environs thereof, the valve operating mechanism within the cylinder head 12, the starting clutch 31 and the like, and to each part of the transmission T. Then, after finishing the predetermined job, the operating oil and the lubricating oil flow downward so as to be received or collected in the oil pan 50.

By the way, a pump capacity of the scavenging pump 48 is set greater than that of the feed pump 49. Therefore, the oil received in the oil pan 50 is immediately pumped up to the oil tank 51 by the scavenging pump 48, and the amount of the oil stored in the oil pan 50 is decreased to the most possible extent, so that it is possible to limit the power loss caused due to the stirring of the stored oil by the crankshaft 25 of the engine E and various kinds of gears of the transmission T.

When the oil stored in the oil tank 51 is increased beyond the first level L1, the increased oil overflows through the first overflow passage 62 to the oil reservoir 53 side which accommodates the lower part of the starting clutch 31, so that the starting clinch 31 is cooled and lubricated by immersing the lower part thereof in the oil, thereby making it possible to improve the durability.

The surplus part of the oil that has filled the oil reservoir 53 flows over the dam 58 into the oil an 50 side. In addition, a part of the oil within the oil reservoir 53 flows through the outlet passage 59 into the oil pan 50 side. However, since the flow passage resistance of the outlet passage 59 is set greater than that of the first overflow passage 62, an outflow amount of the oil from the outlet passage 59 is smaller than an inflow amount of the oil from the first overflow passage 62 to the oil reservoir 53 side.

Like this, during the operation of the engine E, the surplus oil which overflows from the oil tank 51 is stored a certain amount in the oil reservoir 53, and the lower part of the starting clutch 31 is immersed in the stored oil in the oil reservoir 53. Therefore, during the operation of the engine E, the cooling and lubrication of the starting clutch 31 can be always ensured, and a power loss due to the oil stirring of the starting clutch 31 can be controlled to the most possible extent.

When the stored oil amount in the oil tank 51 is increased further until the oil level thereof goes over the second level L2, the increased part of the oil overflows through the second overflow passage 63 into the oil pan 50 side. Since the flow passage resistance of the second overflow passage 63 is set smaller than that of the first overflow passage 62, the surplus oil can overflow smoothly into the oil pan 50 side and it is possible to avoid an unnecessary rise in the load of the scavenging pump 48.

When the operation of the scavenging pump 48 and the feed pump 49 stops in response to the stop of operation of the engine E, the overflow of the oil from the oil tank 51 through the first overflow passage 62 to the oil reservoir 53 side stops after the oil level of the stored oil in the oil tank 51 goes below the first level L1. On the other hand, since the stored oil in the oil reservoir 53 continues flowing out through the outlet passage 59 into the oil pan 50 side, the oil reservoir 53 is substantially emptied of the oil after a lapse of a predetermined time. In this respect, when the oil reservoir 53 is substantially emptied of the oil, it means not that the oil reservoir 53 becomes completely empty but that the oil level of the oil reservoir 53 is lowered until the bottom surface of the starting clutch 31 is exposed.

Accordingly, when starting the engine E again, since the oil reservoir 53 is in substantially an empty condition, the oil stirring due to the rotation of starting clutch 31 does not occur, thereby reducing the starting load, so that the starting of the engine E can be smoothly performed.

Furthermore, since the oil tank 51 and the oil reservoir 53 are formed between the joining surfaces of the front case cover 10f and the intermediate case 10m which form a part of the power unit case 10, the power unit P can be simplified in construction and lightened in weight, without providing special oil tank and oil reservoir separate from the power unit case 10.

While a preferred embodiment of the present invention has been described, it is to be understood that the present invention is not limited to the above described embodiment, and that various changes and modifications may be made without departing from the sprit of the present invention.

We claim:

1. A lubricating device for a power unit, comprising:
a power unit case, including
  an oil pan which receives oil that has lubricated an engine and a transmission,
  an oil tank which is separate from said oil pan, and
  an oil reservoir which stores oil to immerse a lower part of a clutch that connects and disconnects a transmission route between the engine and the transmission,
a scavenging pump which circulates oil in said oil pan to said oil tank; and
a feed pump which feeds oil stored in said oil tank to the engine and the transmission, and
wherein a first overflow passage is provided in said oil tank such that when oil stored in said oil tank is increased beyond a first level, said first overflow passage allows excess oil to overflow into said oil reservoir.

2. The lubricating device for a power unit according to claim 1, further comprising an outlet passage in a bottom portion of said oil reservoir, which allows oil to flow from said oil reservoir to said oil pan, wherein an outflow amount of oil passing said outlet passage is less than an outflow amount of oil flowing from said oil tank to said oil reservoir.

3. The lubricating device for a power unit according to claim 2, further comprising a second overflow passage in said oil tank such that when oil in said oil tank is increased beyond a second level, said second overflow passage allows excess oil to overflow into said oil pan, the second level being higher than the first level.

4. The lubricating device for a power unit according to claim 3, wherein an oil filler hole is provided in an upper part of said oil tank, said oil filler hole being opened into said oil tank above a lower edge of said second overflow passage and being normally closed by a filler cap.

5. The lubricating device for a power unit according to claim 4, further comprising an oil strainer is disposed within said oil tank, said oil strainer being a partition between an internal part of said oil tank into an upper chamber and a lower chamber,
- wherein said oil filler hole, said first overflow passage and said second overflow passage open into said upper chamber, and
- wherein said first overflow passage and said second overflow passage are offset with respect to said oil filler hole, in a plan view from above.

6. The lubricating device for a power unit according to claim 1, further comprising a second overflow passage in said oil tank such that when oil in said oil tank is increased beyond a second level, said second overflow passage allows excess oil to overflow into said oil pan, the second level being higher than the first level.

7. The lubricating device for a power unit according to claim 6, wherein an oil filler hole is provided in an upper part of said oil tank, said oil filler hole being opened into said oil tank above a lower edge of said second overflow passage and being normally closed by a filler cap.

8. The lubricating device for a power unit according to claim 7, further comprising an oil strainer is disposed within said oil tank, said oil strainer being a partition between an internal part of said oil tank into an upper chamber and a lower chamber,
- wherein said oil filler hole, said first overflow passage and said second overflow passage open into said upper chamber, and
- wherein said first overflow passage and said second overflow passage are offset with respect to said oil filler hole, in a plan view from above.

9. The lubricating device for a power unit according to claim 1,
- wherein the power unit case is divided into a case cover which covers the clutch, and a case block adjacent to said case cover, and
- wherein said oil tank and said oil reservoir are formed between joining faces of said case cover and said case block.

* * * * *